United States Patent
Ogoro

(12) 
(10) Patent No.: US 6,519,706 B1
(45) Date of Patent: Feb. 11, 2003

(54) DSP CONTROL APPARATUS AND METHOD FOR REDUCING POWER CONSUMPTION

(75) Inventor: Kazuo Ogoro, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/412,537

(22) Filed: Oct. 5, 1999

(30) Foreign Application Priority Data

Oct. 12, 1998 (JP) .......................................... 10-289542

(51) Int. Cl.$^7$ ................................................ G06F 1/08
(52) U.S. Cl. ...................................... 713/322; 713/501
(58) Field of Search ................................ 713/322, 323, 713/500, 501, 600, 601

(56) References Cited

U.S. PATENT DOCUMENTS

| | | | |
|---|---|---|---|
| 5,727,193 A | * 3/1998 | Takeuchi | 713/501 |
| 5,774,704 A | 6/1998 | Williams | |
| 5,815,693 A | 9/1998 | McDermott et al. | |
| 5,996,083 A | * 11/1999 | Gupta et al. | 713/322 |
| 6,049,882 A | * 4/2000 | Paver | 713/322 |
| 6,141,762 A | * 10/2000 | Nicol et al. | 713/300 |

FOREIGN PATENT DOCUMENTS

| | | |
|---|---|---|
| GB | 2 194 082 A | 2/1988 |
| GB | 2 246 455 | 1/1992 |
| GB | 2 287 555 A | 9/1995 |
| GB | 5815693 | 9/1999 |
| JP | 56-47843 | 4/1981 |
| JP | 1-120610 | 5/1989 |
| JP | 3-51902 | 3/1991 |
| JP | 3-217916 | 9/1991 |
| JP | 4-235618 | 8/1992 |
| JP | 5-113884 | 5/1993 |
| JP | 6-232797 | 8/1994 |
| JP | 7-46171 | 2/1995 |
| JP | 9-114540 | 5/1997 |
| JP | 9-297688 | 11/1997 |
| JP | 10-187300 | 7/1998 |
| JP | 10-313264 | 11/1998 |
| WO | WO 95/35540 | 2/1995 |

* cited by examiner

*Primary Examiner*—Dennis M. Butler
(74) *Attorney, Agent, or Firm*—Scully, Scott, Murphy & Presser

(57) ABSTRACT

A digital signal processor (DSP) control apparatus includes a DSP, estimation unit, calculation unit, and clock generator. The DSP performs digital signal arithmetic processing using a clock having a variable frequency. The estimation unit estimates an arithmetic processing amount of the DSP. The calculation unit calculates a new clock frequency on the basis of an estimated arithmetic processing amount from the estimation unit. The clock generator supplies a clock having a frequency calculated by the calculation unit to the DSP.

16 Claims, 5 Drawing Sheets

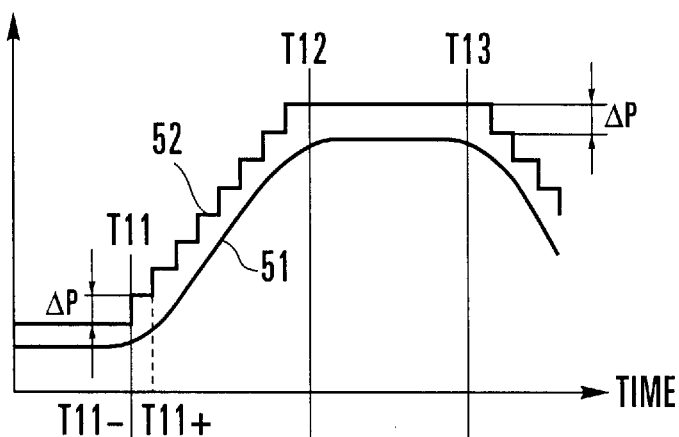
FIG.5A
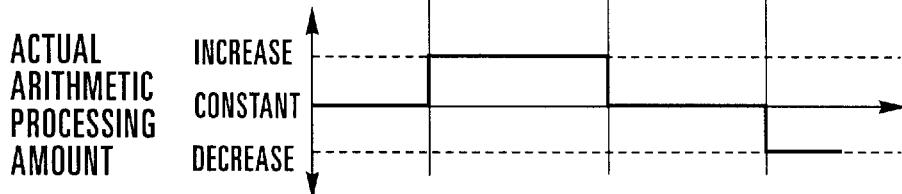
FIG.5B
| OPERATING STATE | ARITHMETIC PROCESSING AMOUNT |
|---|---|
| STANDBY (STEADY STATE) | $P_{11}$ |
| STANDBY (START OF HANDOVER) | $P_{12}$ |
| STANDBY (DURING HANDOVER) | $P_{13}$ |
| START OF SPEECH COMMUNICATION | $P_{21}$ |
| DURING SPEECH COMMUNICATION (STEADY STATE) | $P_{22}$ |
| END OF SPEECH COMMUNICATION | $P_{23}$ |
| SPEECH COMMUNICATION (START OF HANDOVER) | $P_{31}$ |
| SPEECH COMMUNICATION (DURING HANDOVER) | $P_{32}$ |
| OUT OF ZONE | $P_{41}$ |
FIG.6

DSP CONTROL APPARATUS AND METHOD FOR REDUCING POWER CONSUMPTION

BACKGROUND OF THE INVENTION

The present invention relates to a DSP (Digital Signal Processor) control apparatus and method and, more particularly, to a DSP control apparatus and method capable of reducing DSP power consumption.

In information equipment and communications equipment such as a CDMA (Code Division Multiple Access) radio terminal, a DSP is generally arranged in addition to a CPU (Central Processing Unit) for controlling the entire equipment. The DSP performs various signal processing operations so as to cope with high-density, high-speed signal processing or an increase in digital signal processing amount.

A DSP of this type is controlled on the basis of event-driven processing. The DSP is normally set in an idle state. The DSP is started by an interrupt when a controller issues a task. The DSP performs desired digital signal arithmetic processing. The DSP returns to the idle state upon completing the arithmetic processing.

The maximum required arithmetic processing amount of a system in a frame having a predetermined period of time is conventionally predicted, as shown in FIG. 10. The clock frequency is generally so fixed as to always complete the arithmetic processing amount for each frame within a frame. The clock frequency must be set to obtain a margin of an idle time tml and not to make an arithmetic processing time tsl short.

No problem occurs in this conventional DSP control apparatus when the arithmetic processing amount of the DSP is always constant. When the arithmetic processing amount greatly changes, e.g., when the arithmetic processing amount becomes extremely small in a time interval T2 shown in FIG. 10, an arithmetic processing time ts2 is shortened to prolong an idle time tm2 under the condition that an arithmetic processing rate S is constant. As a result, the power is wastefully consumed.

In the idle state, the clock supplied to the DSP may be disabled to reduce the current consumption in the DSP on the average. To disable the clock supplied to the DSP, an external oscillator circuit must be temporarily stopped. When the oscillator circuit resumes oscillation, a time (nonnegligible time length) is required to stabilize oscillation. When an event is driven to supply an interrupt to the DSP, arithmetic processing cannot be immediately started.

Even in the idle state, the external oscillator circuit for supplying clocks to the DSP must be kept continued, and the power consumption of the external oscillator circuit cannot be set zero. For example, when the idle state per unit time is long due to a small DSP processing amount, the power consumption cannot be reduced in proportion to the processing amount.

A clock having a relatively low frequency may be supplied to the DSP in order to reduce the time interval of the idle state. In this case, a maximum arithmetic processing amount in full-operation of the DSP is undesirably reduced.

SUMMARY OF THE INVENTION

It is an object of the present invention to provide a DSP control apparatus capable of reducing the power consumption of a DSP and its peripheral circuits.

In order to achieve the above object of the present invention, there is provided a digital signal processor (DSP) control apparatus comprising arithmetic processing means for performing digital signal arithmetic processing using a clock having a variable frequency, estimation means for estimating an arithmetic processing amount of the arithmetic processing means, calculation means for calculating a new clock frequency on the basis of an estimated arithmetic processing amount from the estimation means, and clock supply means for supplying a clock having a frequency calculated by the calculation means to the arithmetic processing means.

BRIEF DESCRIPTION OF THE DRAWINGS

FIGS. 5A and 5B are timing charts showing an arithmetic processing amount used in another method of estimating an arithmetic processing amount in the arithmetic processing amount estimation unit in FIG. 1, and an actual change in arithmetic processing amount;

FIG. 6 a table of arithmetic processing amounts used in still another method of estimating an arithmetic processing amount in the arithmetic processing amount estimation unit in FIG. 1;

DESCRIPTION OF THE PREDERRED EMBODIMENTS

The present invention will be described in detail with reference to the accompanying drawings.

Figure 1:
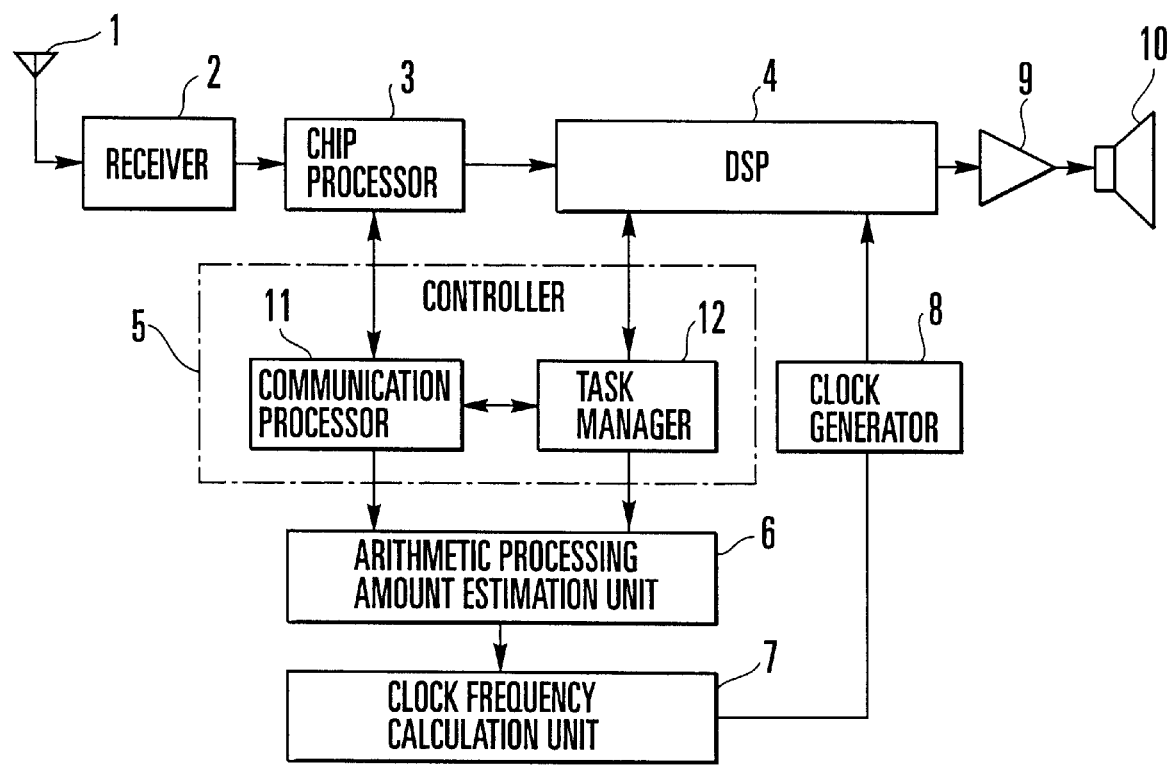
FIG. 1 is a block diagram of a DSP control apparatus according to an embodiment of the present invention.

FIG. 1 shows a DSP control apparatus according to an embodiment of the present invention. In this embodiment, the DSP control apparatus is applied to the reception system of a CDMA radio system.

In this embodiment, a clock generator is arranged to supply a clock having an arbitrary frequency to a DSP, and the frequency of the clock supplied from the clock generator to the DSP is controlled on the basis of an arithmetic processing amount in the DSP.

Referring to FIG. 1, reference numeral 1 denotes an antenna; 2, a receiver for receiving a radio wave via the antenna 1; 3, a chip processor for determining a plurality of paths for components to be decoded from a reception signal received by the receiver 2; 4, a DSP for performing various digital signal arithmetic processing operations in accordance with an arithmetic processing request; 5, a controller for sending an arithmetic processing request to the DSP 4 and controlling the respective parts of the CDMA radio terminal; 9, an amplifier for amplifying a speech signal obtained from the DSP 4; and 10, a loudspeaker for producing an output from the amplifier 9.

Reference numeral 8 denotes a clock generator for supplying a clock having an arbitrary frequency to the DSP 4. The clock generator 8 may comprise a VFO (Variable Frequency Oscillator), e.g., VCO (Voltage-Controlled Oscillator), or a PLL (Phase-Locked Loop) circuit. In particular, the PLL circuit can generate a good clock having a stable frequency.

Reference numeral 6 denotes an arithmetic processing amount estimation unit for estimating an arithmetic processing amount in the DSP 4 on the basis of information from the controller 5; and 7, a clock frequency calculation unit for calculating a new frequency of the clock to be supplied to the DSP 4 on the basis of the arithmetic processing amount estimated in the arithmetic processing amount estimation unit 6 and instructing this calculated frequency to the clock generator 8.

The controller 5 comprises a communication processor 11 for managing the communication state and operation of the CDMA radio terminal and a task manager 12 for managing task processing of the DSP 4 that is required in the communication processor 11. A plurality of parallel tasks are supplied from the task manager 12 to the DSP 4 on the basis of event-driven processing. The contents of the tasks issued to the DSP 4 are, e.g.,, decoding processing for a time-continuous speech signal, arithmetic processing for supporting path determination processing in the chip processor 3, de-spread processing using different delay timings for the respective paths, phase shift detection/interpolation processing, and radio wave detection processing. Most of these processing operations have limited processing times. In this embodiment, all tasks issued to the DSP 4 must be completed within a frame having a predetermined period of time.

The arithmetic processing amount in the DSP 4 generally increases with increases in arithmetic processing speed and processing time. The arithmetic processing amount is assumed to be proportional to the product of the arithmetic processing speed and time. The arithmetic processing speed represents the arithmetic processing amount of the DSP 4 per unit time and is almost proportional to the clock frequency of the DSP 4. In practice, since each tank is made up of a large number of instructions (operating sequence), one or more clock time lengths are required to execute one instruction. Therefore, the average number of clocks per instruction must be taken into consideration.

The operation of the DSP having the above arrangement will be described with reference to FIG. 2.

In the initial state such as a power-on state, a predetermined frequency corresponding to an arithmetic processing amount in the DSP 4 is instructed from the clock frequency calculation unit 7 to the clock generator 8. A clock having the instructed frequency is supplied to the DSP 4. The DSP 4 then starts arithmetic processing on the basis of the clock corresponding to the arithmetic processing amount in accordance with a task issued from the task manager 12.

Figure 2:
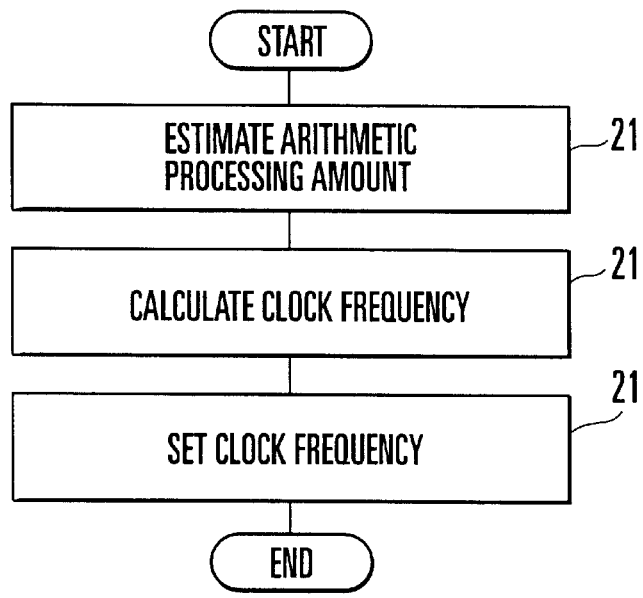
FIG. 2 is a low chart showing the operation of the DSP control apparatus shown in FIG. 1.

The clock frequency update processing shown in FIG. 2 is repeatedly performed every predetermined period of time, e.g., every frame. This operation will be described in detail below. The arithmetic processing amount estimation unit 6 estimates the current arithmetic processing amount in the DSP 4 (step 21). The clock frequency calculation unit 7 calculates a clock frequency enough to complete, within a frame, the arithmetic processing amount estimated by the arithmetic processing amount estimation unit 6 (step 22). The clock frequency calculation unit 7 outputs the calculated clock frequency to the clock generator 8. The clock generator 8 sets the clock frequency in accordance with the instruction from the clock frequency calculation unit 7 (step 23). Therefore, supply of clocks having a new frequency to the DSP 4 is started.

Figure 3:
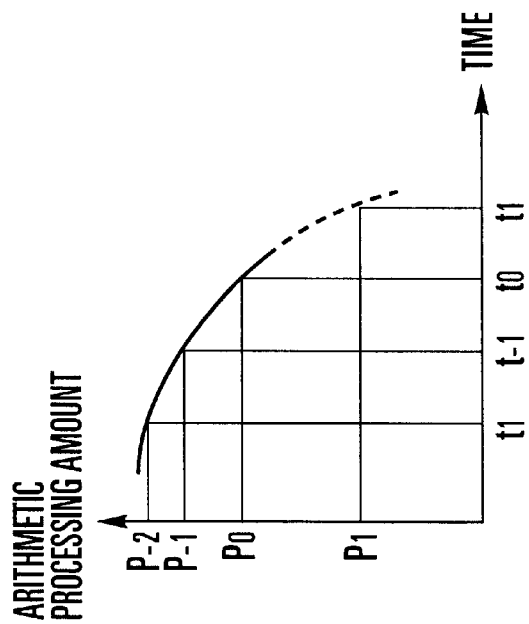
FIG. 3 is a timing chart showing a change in arithmetic processing amount used in a method of estimating an arithmetic processing amount in an arithmetic proce ount estimation unit in FIG. 1.

As an example of the arithmetic processing amount estimation method in the arithmetic processing amount estimation unit 6, as shown in FIG. 3, a new arithmetic processing amount is estimated in accordance with the transition of the arithmetic processing amount from the task manager 12 up to the present in the DSP 4. That is, a future (time t1) arithmetic processing amount P1 is estimated by the first approximation, second approximation, or linear prediction using a current (time t0) arithmetic processing amount P0 and past (time t-1 and time t-2) arithmetic processing amounts P-1 and P-2.

Figure 4:
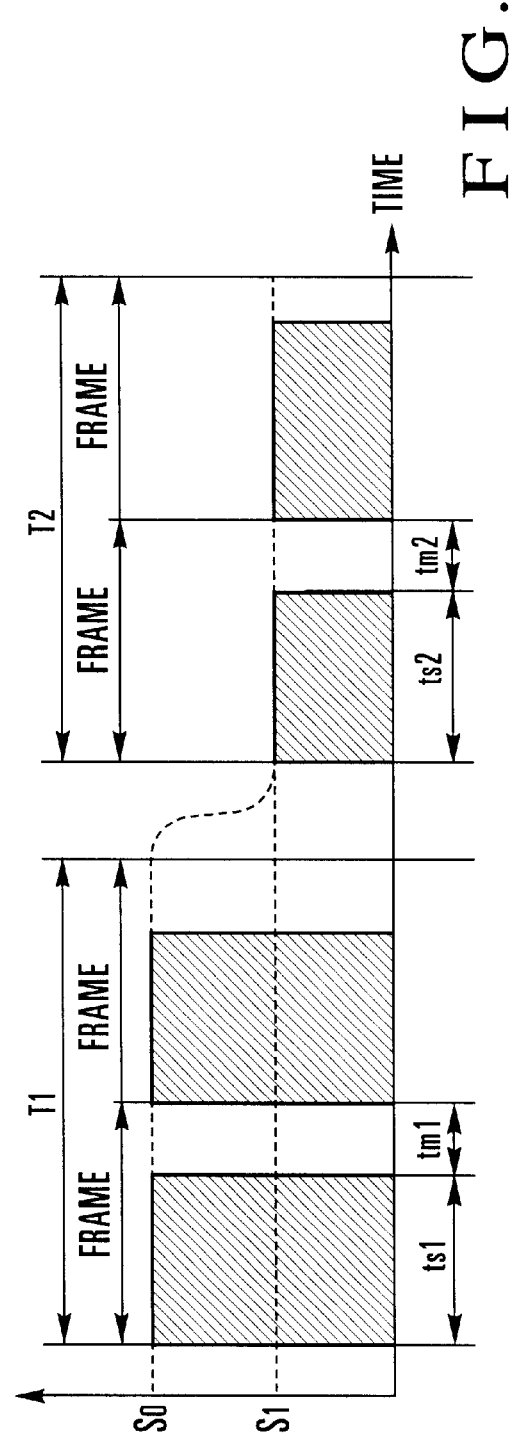
FIG. 4 is a timing chart showing the operation of the DSP control apptus shown in FIG. 1.

As shown in FIG. 3, when the arithmetic processing amount estimation unit 6 estimates a decrease in the future (time t1) arithmetic processing amount in the DSP 4, the clock frequency calculation unit 7 controls the clock generator 8 so as to reduce the clock frequency of the DSP 4 in order to reduce a current arithmetic processing speed S0 in a time interval T1 to an arithmetic processing speed S1 in a time interval T2, as shown in FIG. 4.

When the arithmetic processing amount estimation unit 6 estimates an increase in arithmetic processing amount in the DSP 4, the clock frequency calculation unit 7 controls the clock controller 8 so as to increase the clock frequency.

The frequency calculation method in the clock frequency calculation unit 7 is performed by a method optimal to the system. For example, arithmetic processing times ts1 and ts2 in the respective frames are set at predetermined time lengths, and the clock frequencies are calculated so as to complete the estimated arithmetic processing amounts within the arithmetic processing times ts1 and ts2. Idle times tm1 and tm2, i.e., arithmetic margins in the respective frames can be assured at predetermined time lengths.

The arithmetic margin is not a predetermined time length, but a predetermined processing amount. In this case, a clock frequency necessary to complete the sum of the estimated arithmetic processing amount and the arithmetic margin within a frame is calculated.

As described above, as the method of estimating the arithmetic processing amount in the arithmetic processing amount estimation unit 6, a new arithmetic processing amount in the DSP 4 is estimated using FIG. 3 from the transition of the arithmetic processing amount up to the present. The present invention is not limited to this. Other estimation methods for the arithmetic processing amounts in the arithmetic processing amount estimation unit 6 will be described with reference to FIGS. 5A to 9B.

FIGS. 5A and 5B show a method of obtaining an estimated arithmetic processing amount 52 by adding or subtracting a predetermined amount to or from an actual arithmetic processing amount in accordance with a direction of change (increase/decrease) in an actual arithmetic processing amount 51. More specifically, an increase in the actual arithmetic processing amount 51 is detected to some extent in accordance with the result of comparison between the actual arithmetic processing amount at time T11 and the actual processing amount at immediately preceding time T11−, as shown in FIG. 5B. A predetermined processing amount ΔP is added to the immediately preceding estimated arithmetic processing amount 52 (from time T11–to time T11) to obtain a new estimated arithmetic processing amount 52 (from time T11 to time T11+).

At time T12, the actual arithmetic processing amount 51 rarely changes, and the estimated arithmetic processing amount 52 is kept constant. At time T13, a certain decrease in actual arithmetic processing amount 51 is detected. The predetermined processing amount ΔP is subtracted from the immediately preceding estimated arithmetic processing amount 52 to obtain a new estimated arithmetic processing amount 52.

According to this method, a new arithmetic processing amount can be estimated by relatively simple processing, and the processing load on the arithmetic processing amount estimation unit 6 can be greatly reduced. Note that the actual arithmetic processing amount 51 may be calculated by the arithmetic processing amount estimation unit 6 in accordance with management information from the task manager 12. An arithmetic processing amount calculated in the task manager 12 may be used.

FIG. 6 shows a table 61 for estimating an arithmetic processing amount in the DSP 4 in accordance with an operating state of, e.g., a CDMA radio terminal. The arithmetic processing amount estimation unit 6 looks up the table in accordance with the operating state of the CDMA radio terminal that is notified from the controller 6 and estimates the arithmetic processing amount in the DSP 4. The arithmetic processing amount in the DSP 4 greatly changes with a change in operating state of the system and rarely changes in the same operating state. This is because the processing operation of the CDMA radio terminal is stable in the same operating state, and the task amount issued to the DSP 4 does not greatly change.

Figure 7A:
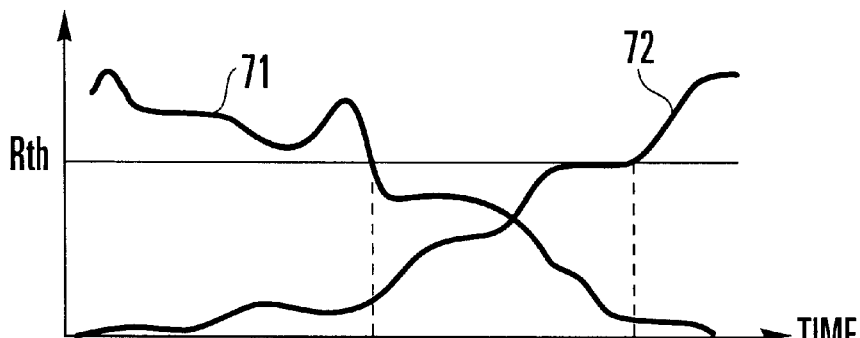
FIGS. 7A and 7B are timing charts showing a received signal strength indicator and a change in arithmetic processing amount in handover operation of a CDMA radio terminal.
Figure 7B:
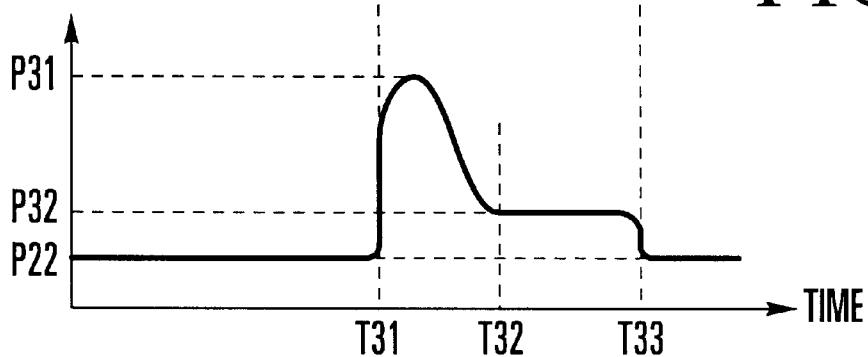

To the contrary, in, e.g., handover operation, the processing operation of the CDMA radio terminal cannot be stable, and the task amount issued to the DSP 4 greatly changes. FIGS. 7A and 7B show changes in received signal strength indicator (RSSI) and arithmetic processing amount in handover operation, particularly, in the communicating state of the CDMA radio terminal.

Before time T31, the RSSI of a synthetic path 71 used in communication (speech communication) is good. The arithmetic processing amount of the DSP 4 during this period is stable at P22 (FIG. 6) of speech communication (steady state). As shown in FIG. 7A, at time T31, when the RSSI of the synthetic path 71 is lower than a predetermined threshold Rth to set a handover state, processing for searching for an alternate synthetic path is started.

Figure 8:
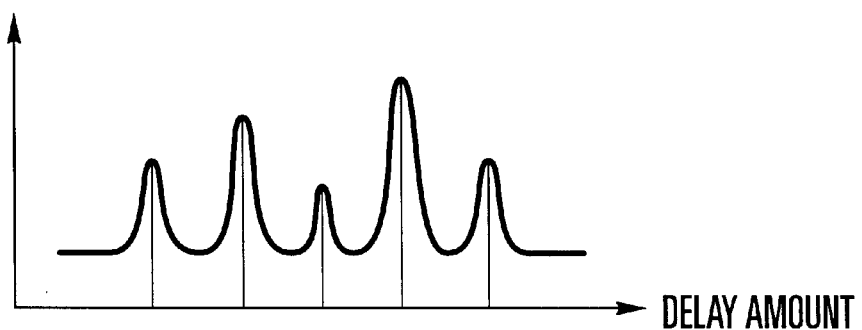
FIG. 8 is a graph showing a reception profile (RSSI profile) in the CDMA radio system.

In this search processing, as shown in FIG. 8, the RSSI profile, i.e., the reception profile is calculated for each delay amount (each phase). The delay amounts for the candidate paths used in a new synthetic path 72 are selected from the descending order of RSSI magnitudes. Immediately after time T31, the arithmetic processing amount in the DSP 4 greatly increases to P31 of speech communication (the start of handover), as shown in FIG. 7B.

At time T32, when the delay amounts of the paths used in the synthetic path 72 are selected, a new reception profile need not be calculated. The DSP 4 calculates the differences between the selected candidate paths, i.e., performs monitor follow-up processing. From time T32, therefore, the arithmetic processing amount in the DSP 4 is reduced to P32 of speech communication (during handover).

As shown in FIG. 7A, at time T33, when the RSSI of the synthetic path 72 exceeds the threshold Rth, it is determined that the communicating state becomes stable, thereby ending the handover processing. At the end of handover processing, monitor follow-up processing for the candidate paths for the synthetic path 72 need not be performed. The arithmetic processing amount in the DSP 4 is reduced to P22 of speech communication (steady state).

As shown in FIG. 6, the approximately estimated arithmetic processing amounts P11 to P41 of the respective operating states in the system are stored in the table 61 in advance, and an estimated arithmetic processing amount is read out from the table 61 in correspondence with the a change in operating state. The DSP control apparatus can quickly and appropriately cope with a great change in arithmetic processing amount in the DSP 4.

Referring to FIG. 6, clock frequencies themselves may be stored in the table 61 in place of the estimated arithmetic processing amounts P11 to P41, and a new clock frequency may be read out from the Table 61 in accordance with a change in operating state. According to this method, a new arithmetic processing amount or clock frequency appropriate to the system can be very easily calculated with a simple arrangement.

Figure 9A:
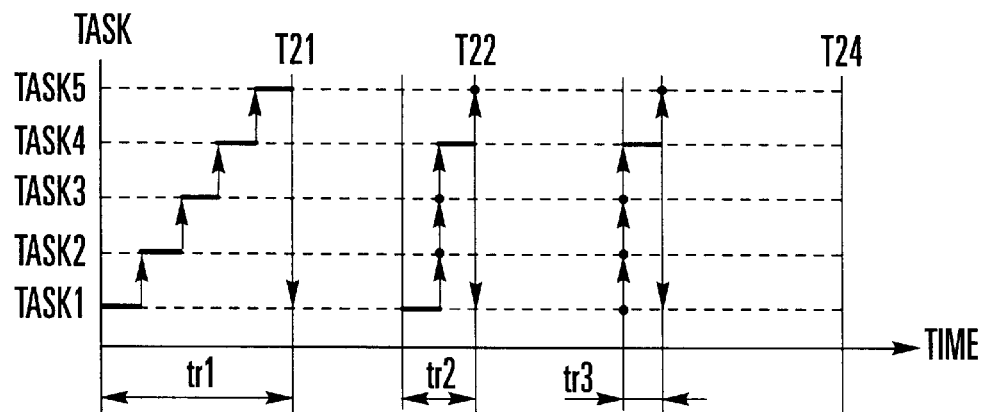
FIGs. 9A and 9B are timing charts showing a task used in still another method of estimating an arithmetic processing amount in the arithmetic processing amount estimation unit in FIG. 1, and a change in task processing time.
Figure 9B:
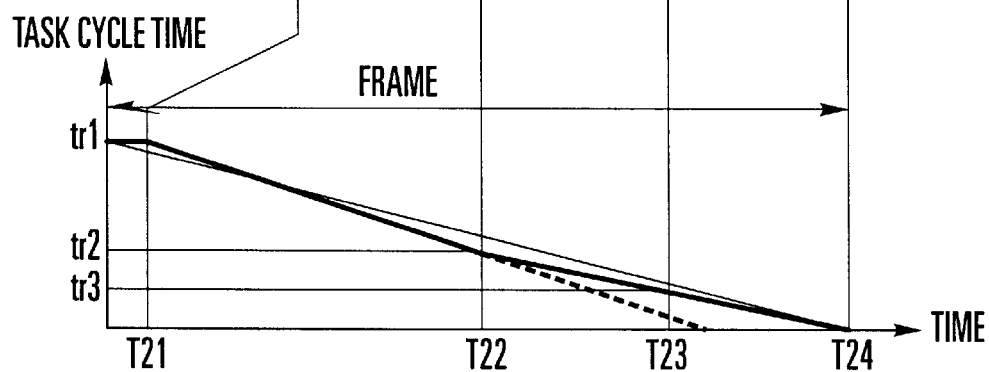
Figure 10:
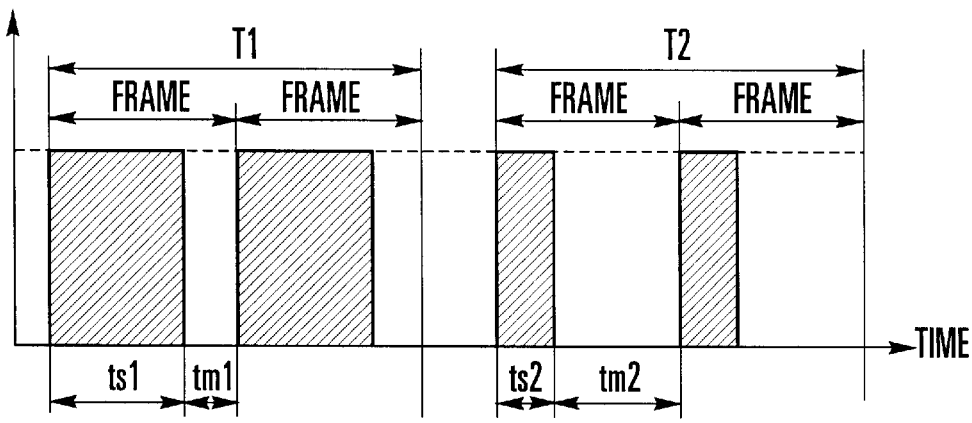
FIG. 10 is a timing chart showing the operation of a conventional DSP.

FIGS. 9A and 9B show a method of estimating an arithmetic processing amount in accordance with a task cycle time in the DSP 4.

At the start of a frame, a predetermined clock frequency is selected from an estimated arithmetic processing amount to start execution of five tasks TSK1 to TSK5. The tasks TSK1 to TSK5 are switched every short time interval by multitask processing and sequentially executed. Processing for completing the cycle of the tasks TSK1 to TSK5 is repeatedly executed until the end of all the tasks.

At time T21, when the five tasks TSK1 to TSK5 are being executed at a predetermined clock frequency, the cycle time of the tasks TSK1 to TSK5 is given as a basic task cycle time tr1. At time T22 as the position half the frame time length, the tasks TSK2, TSK3, and TSK5 are completed. A time required to complete the above tasks is short, so that the task cycle time is shortened to tr2.

The presence/absence of the arithmetic margin of the DSP arithmetic processing amount after time T22 can be confirmed in accordance with the task cycle times tr1 and tr2 and the time position in the frame. More specifically, time T22 is given as the position half the frame time length. When the task cycle time tr2 at time T22 is shorter than half the basic task cycle time tr1, processing speed up to time T22 can be estimated to be higher than the average speed. In this case, all the tasks are completed at time T23 before frame end time T24.

When the arithmetic margin is confirmed as described above, the arithmetic processing amount estimation unit 6 estimates a new arithmetic processing amount on the basis of a ratio of the task cycle times tr1 and tr2 and the time position in the frame at time T22. The clock frequency calculation unit 7 sets a new clock frequency lower than the current clock frequency during the frame on the basis of the new estimated arithmetic processing amount. In this case, the remaining tasks are completed at the end of frame or immediately before the end of frame, thereby reducing the power consumption by a decrease in clock frequency.

This embodiment makes it possible to always calculate an optimal DSP arithmetic operation with a small current consumption. Note that the task manager 12 may measure the task cycle time tr2, and the task cycle time tr2 may be measured by the arithmetic processing amount estimation unit 6 in accordance with the information from the task manager 12.

In the above embodiment, processing in the arithmetic processing amount estimation unit 6 and clock frequency calculation unit 7 may be performed in the controller 5 or DSP 4. In this case, the circuit size can be reduced.

The above embodiment has described estimation of the arithmetic processing amount in a frame. However, the arithmetic processing amount may be estimated on the basis of an idle state occupation ratio, i.e., an arithmetic margin contained in all the arithmetic processing amounts in the frame.

According to the methods of estimating arithmetic processing amounts described with reference to FIGS. 3, 5A and 5B, and 6, the arithmetic processing amount is estimated in units of frames. The present invention is not limited to this. An arithmetic processing amount may be estimated every predetermined time interval shorter than the frame.

The DSP control apparatus is applied to the radio system of a CDMA radio system. However, the present invention is not limited to this. The present invention is applicable to any apparatus if it uses a digital signal processor.

As has been described above, according to the present invention, an extra idle state can be suppressed, and the digital signal processor can operate at a minimum, necessary clock frequency. As a result, the power consumption in the digital signal processor can be reliably reduced.

What is claimed is:

1. A digital signal processor (DSP) control apparatus comprising:
    an arithmetic processing means for performing digital signal arithmetic processing using a clock having a variable frequency;
    estimating means for estimating an arithmetic processing amount of said arithmetic processing means;
    calculation means for calculating a new clock frequency on the basis of an estimated arithmetic processing amount from said estimation means; and
    clock supply means for supplying a clock having a frequency calculated by said calculation means to said arithmetic processing means.

2. An apparatus according to claim 1, wherein said estimation means estimates a new arithmetic processing amount of said arithmetic processing means on the basis of a transition of arithmetic processing amounts of said arithmetic processing means up to the present.

3. An apparatus according to claim 1, wherein said estimation means adds/subtracts a predetermined arithmetic processing amount to/from an immediately preceding estimated arithmetic processing amount to estimate a new arithmetic processing amount of said arithmetic processing means on the basis of an increase/decrease of the immediately preceding arithmetic processing amount of said arithmetic processing means.

4. An apparatus according to claim 1, wherein said estimation means estimates the arithmetic processing amount of said arithmetic processing means on the basis of operation information of a system using said DSP.

5. An apparatus according to claim 4, wherein
    said apparatus further comprises a table that stores estimated arithmetic processing amounts of said arithmetic processing means in advance in correspondence with operating states of said system using said DSP, and
    said estimation means obtains an estimated arithmetic processing amount of said arithmetic processing means by looking up said table in accordance with an operating state of said system.

6. An apparatus according to claim 1, wherein said estimation means estimates an arithmetic processing amount of said arithmetic processing means in accordance with a transition of a task cycle time when said arithmetic processing means performs multitask processing for a plurality of arithmetic processing operations.

7. An apparatus according to claim 1, wherein said estimation means estimates an arithmetic processing amount of said arithmetic processing means on the basis of an arithmetic margin representing an occupation ratio of an idle state included in a processing operation of said arithmetic processing means.

8. An apparatus according to claim 1, wherein
    said apparatus further comprises control means for controlling a CDMA (Code Division Multiple Access) radio terminal, and
    said arithmetic processing means performs a plurality of arithmetic processing operations associated with speech communication control in response to an arithmetic processing request from said control means.

9. A DSP (Digital Signal Processor) control method comprising the steps of:
    estimating an arithmetic processing amount of a DSP using a clock having a variable frequency where a required arithmetic process amount needed to process a plurality of currently running parallel tasks is unknown;
    calculating a new clock frequency on the basis of an estimating arithmetic processing amount; and
    supplying a clock having a calculated frequency to said DSP.

10. A method according to claim 9, wherein the estimating step comprises the step of estimating a new arithmetic processing amount of said DSP on the basis of a transition of arithmetic processing amounts of said DSP during a predetermined period of time.

11. A method according to claim 9, wherein the estimating step comprises the steps of:
    determining an increase/decrease of an immediately preceding arithmetic processing amount of said DSP; and
    estimating a new arithmetic processing amount of said DSP by adding/subtracting a predetermined arithmetic processing amount to/from the immediate preceding estimated arithmetic processing amount of said DSP on the basis of a determination result.

12. A method according to claim 9, wherein the estimating step comprises the step of estimating an arithmetic processing amount of said DSP on the basis of operation information of a system using said DSP.

13. A method according to claim 12, wherein the estimating step comprises the steps of:
    storing in a table estimated arithmetic processing amounts of said DSP in correspondence with operating sates of said system using said DSP; and
    obtaining an estimated arithmetic processing amount of said DSP by looking up said table in accordance with an operating state of said system.

14. A method according to claim 9, wherein the estimating step comprises the step of estimating an arithmetic processing amount of said DSP in accordance with a transition of a task cycle time when said DSP performs multitask processing for a plurality of arithmetic processing operations.

15. A method according to claim 9, wherein the estimating step comprises the step of estimating an arithmetic processing amount of said DSP on the basis of an arithmetic margin representing an occupation ratio of an idle state included in a processing operation of said DSP.

16. A method according to claim 9, wherein said DSP performs a plurality of arithmetic processing operations associated with speech communication control in response to an arithmetic processing request from a controller for controlling a CDMA radio terminal.

* * * * *